June 18, 1935.  J. G. JONES ET AL  2,005,375
AUTOMATIC ALL METAL SPOOL MAKING MACHINE
Filed Aug. 1, 1933   8 Sheets-Sheet 1

Inventors
John G. Jones & Haywood G. Dewey,
By George A. Gillette, Jr.
Attorneys June 18, 1935.  J. G. JONES ET AL  2,005,375
AUTOMATIC ALL METAL SPOOL MAKING MACHINE
Filed Aug. 1, 1933   8 Sheets-Sheet 2

Inventors
John G. Jones & Haywood G. Dewey,
By George A. Gillette, Jr.
Attorneys

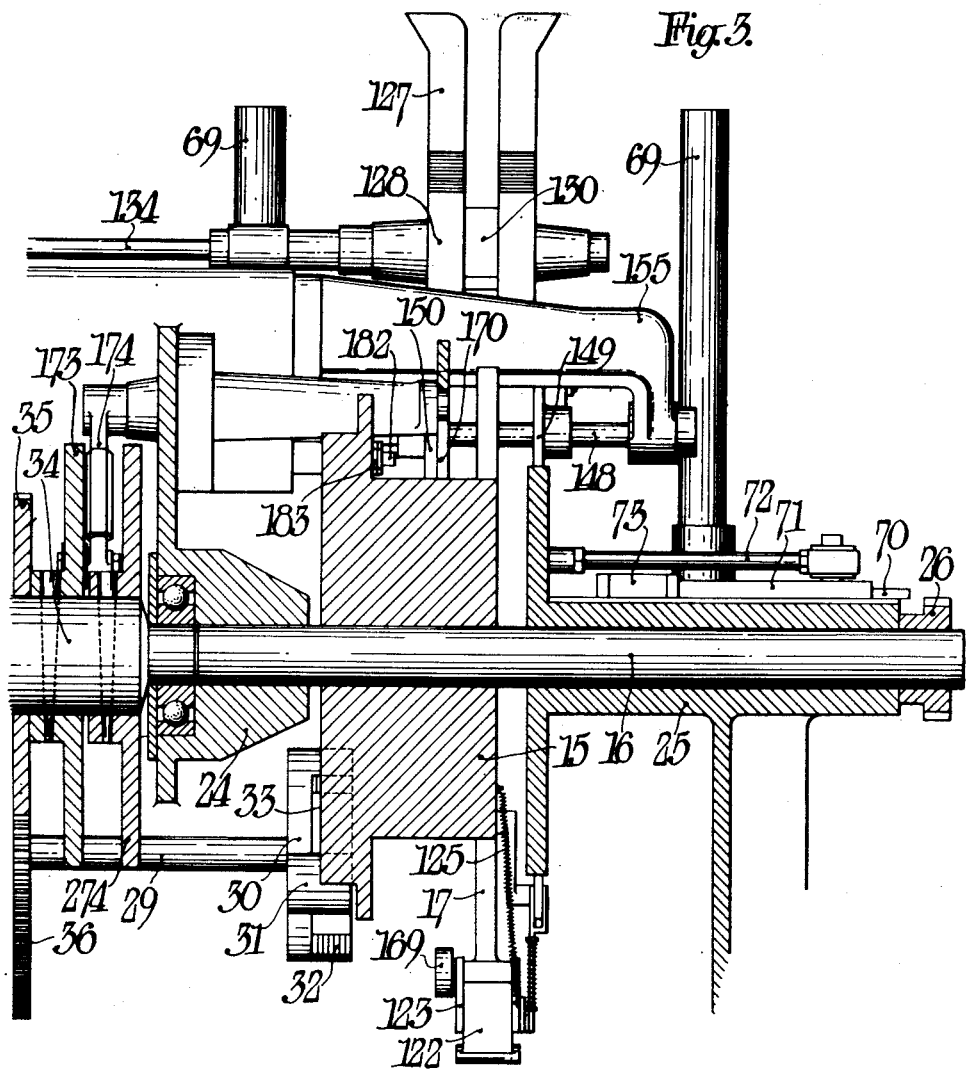

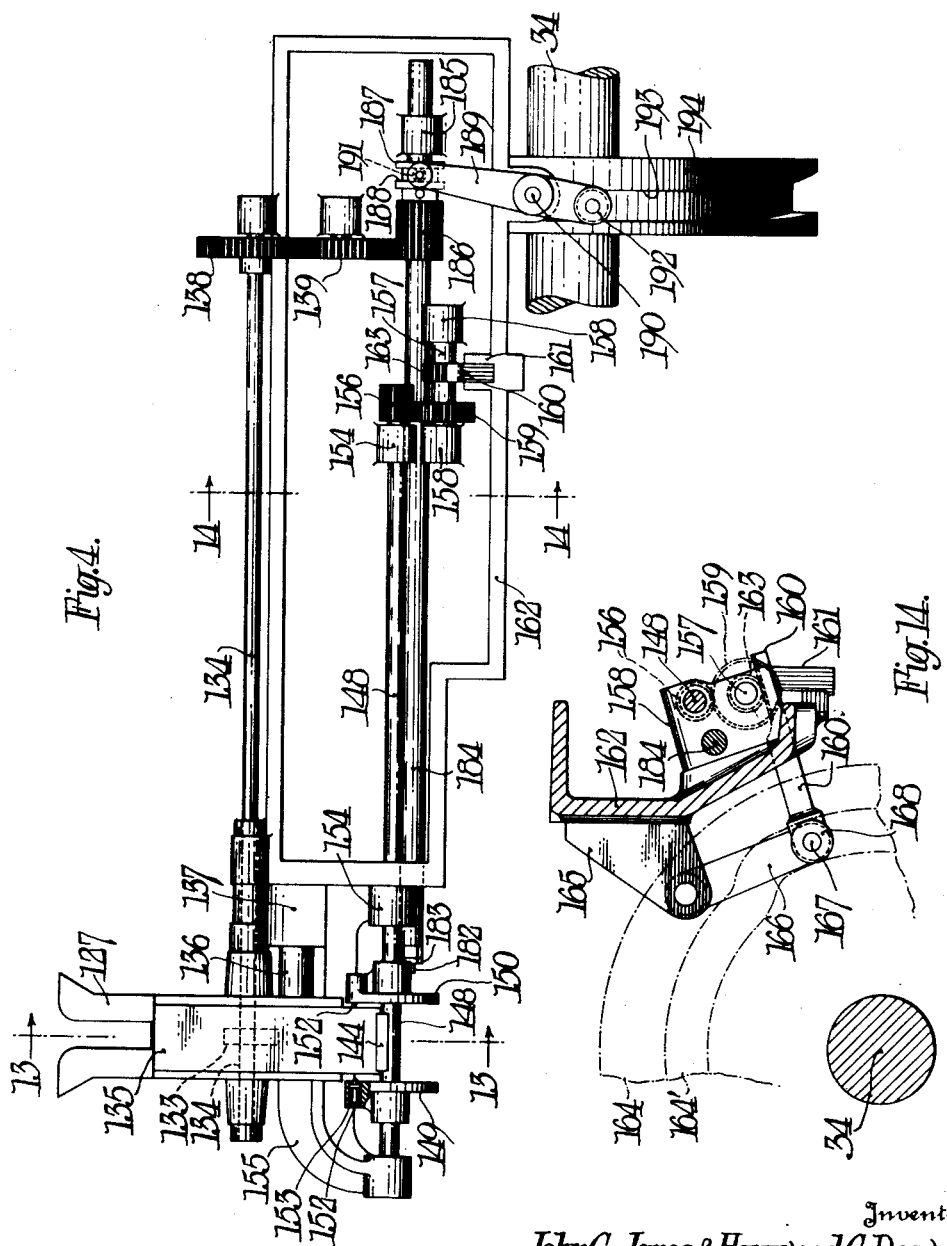

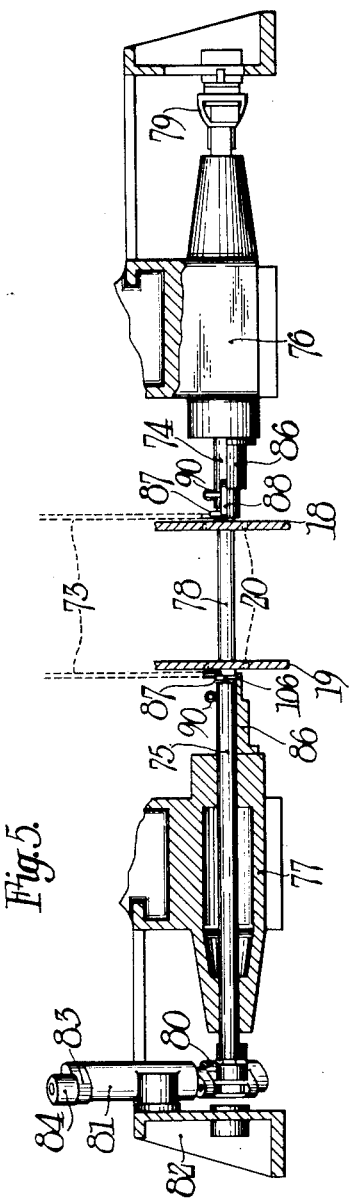
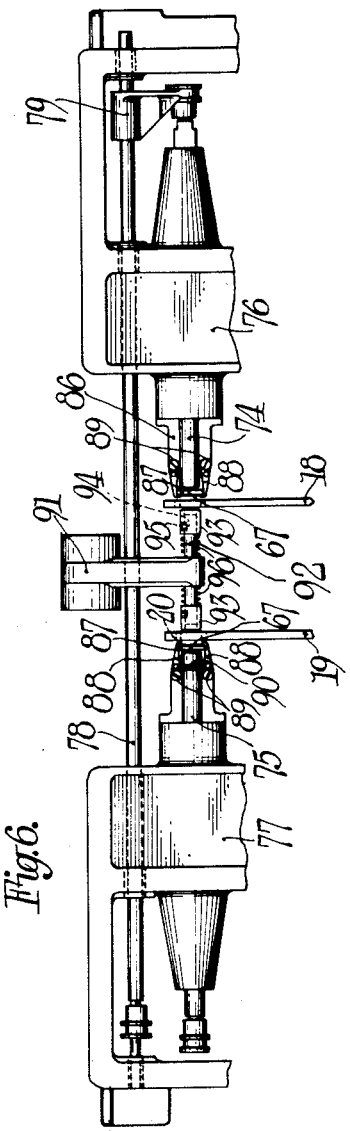

June 18, 1935.  J. G. JONES ET AL  2,005,375
AUTOMATIC ALL METAL SPOOL MAKING MACHINE
Filed Aug. 1, 1933   8 Sheets-Sheet 6
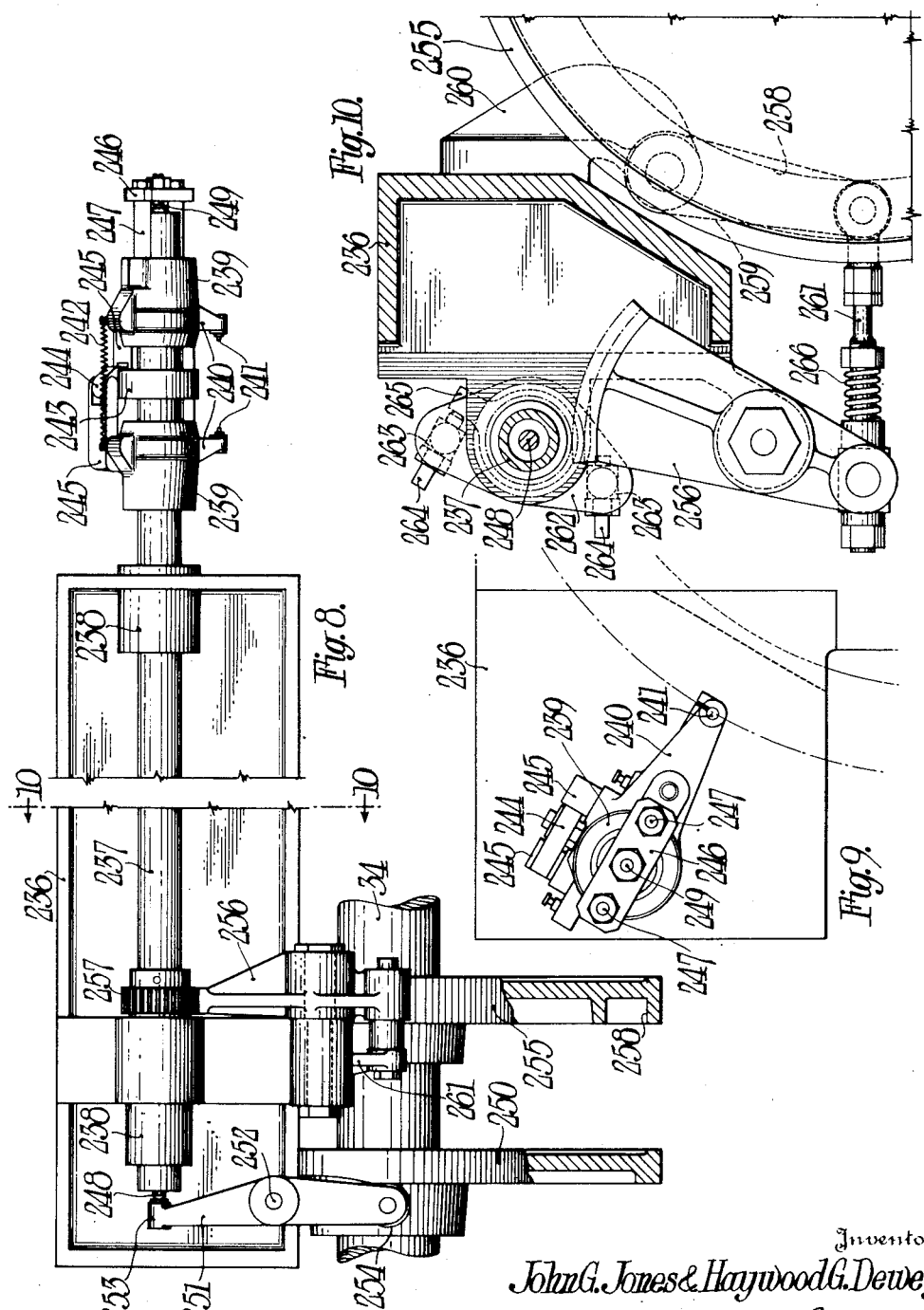
Inventors:
John G. Jones & Haywood G. Dewey,
By George A. Gillette, Jr.
Attorneys

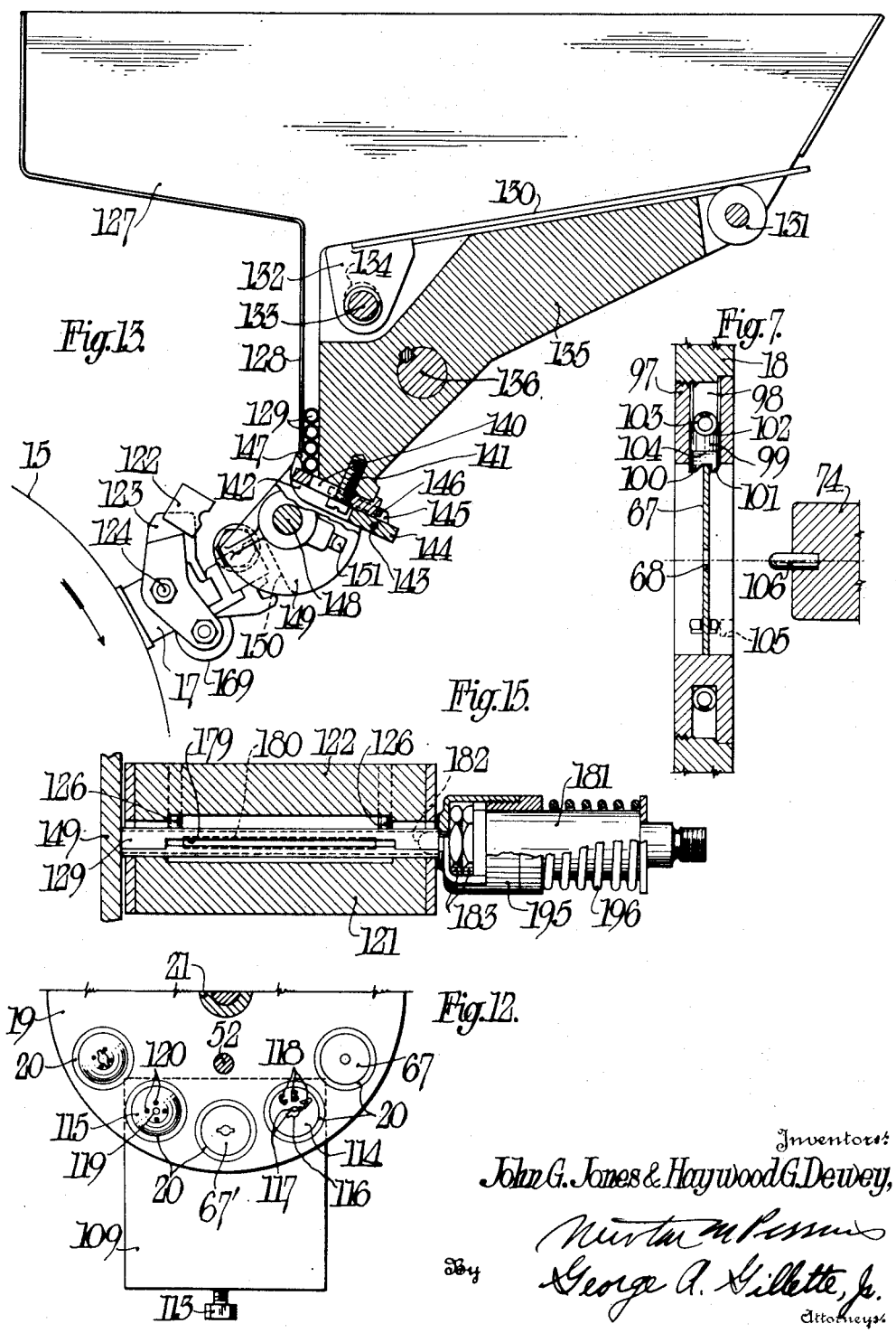

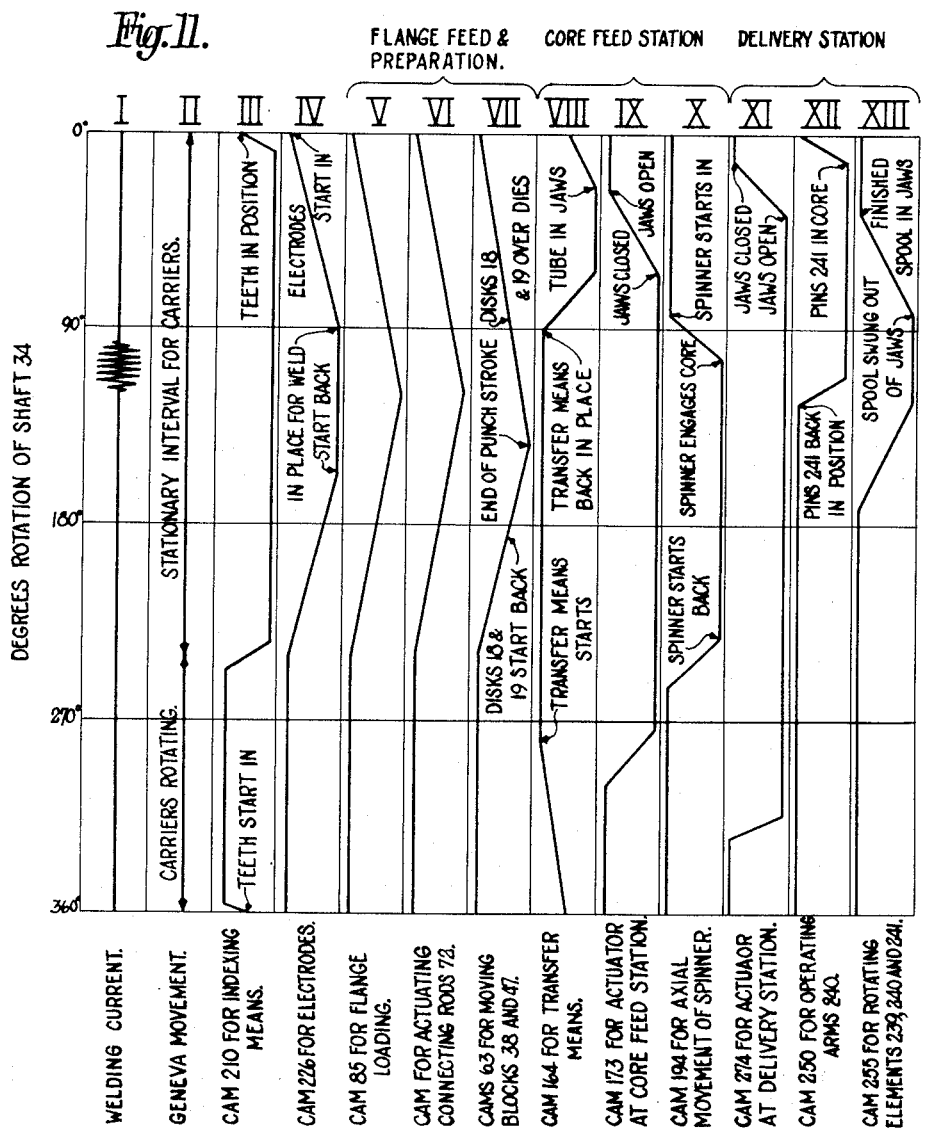

Patented June 18, 1935

2,005,375

UNITED STATES PATENT OFFICE 2,005,375

AUTOMATIC ALL-METAL SPOOL MAKING MACHINE

John G. Jones and Haywood G. Dewey, Rochester, N. Y., assignors to Eastman Kodak Company, Rochester, N. Y., a corporation of New York Application August 1, 1933, Serial No. 683,156

61 Claims. (Cl. 29—38)

The present invention relates to a spool making machine and more particularly to an automatic machine for uniting by electric welding the core and flanges of a photographic film spool.

Automatic machines for welding the core and flanges of a film spool have been previously known but the machine of the present invention embodies many advantages over the known machines and especially the automatic machine disclosed in Jones and Dewey Patent No. 1,616,973 issued on Feb. 8, 1927.

The primary object of the present invention is the provision of an automatic spool making machine which is more efficient and which may be operated at high speeds rapidly to produce finished spools.

Another object of the invention is the provision of an automatic spool making machine in which the flange blanks are fed into a rotatable carrier which is intermittently rotated to various stations for preparation of the flange and delivery to an assembly station.

A further object is the provision of an automatic spool making machine in which the flange blanks and the cores are supplied to respective rotatable carriers which are rotated to move said cores and flanges into alignment at an assembly station.

Still another object of the invention is the provision of an intermittent drive for said carriers which provides stationary intervals for core feeding, flange feeding, flange slotting and deformation, welding of the flanges to the core, and removing the finished spool from one of said carriers.

A still further object of the invention is the provision of actuators for the core holders to open and close the jaws of said holders at appropriate times during the stationary interval of one of said carriers.

Another object is to provide a machine which assembles the flanges and the core with slots therein in a definite relation to each other so as to facilitate certain film spooling operations.

With these objects in view, the present invention consists in certain features of novelty in the construction, combination, and arrangement of parts by which the said objects and certain other objects are effected, all as fully described with respect to the accompanying drawings, and more particularly pointed out in the appended claims.

Reference is hereby made to the accompanying drawings in the several figures of which similar reference characters designate similar elements and wherein:

Fig. 3 is also a fragmentary vertical cross-section and illustrates the flange feed and the intermittent power drive.

Fig. 4 is a side elevation of the core feeding mechanism.

Fig. 5 is a vertical section through the flange feeding station.

Fig. 6 is a plan view of the flange feeding station.

Fig. 7 is a vertical fragmentary section to enlarged scale through one of the clutch elements on the flange carrier and taken on the line 6—6 of Fig. 1.

Fig. 8 is a side elevation of the finished spool delivery mechanism.

Fig. 9 is an end elevation of the spool engaging mechanism in relation to the rotatable carrier for the cores and finished spools.

Fig. 10 is a fragmentary end elevation of the means for rotating the spool engaging mechanism to remove the finished spool from the carrier.

Fig. 11 is a time chart for the several cams of the machine and their relation to each other during one cycle of machine operation.

Fig. 12 is a vertical fragmentary section illustrating the preferred form of punch press and is taken on the line 12—12 of Fig. 2.

Fig. 13 is a fragmentary vertical section through the core feed station taken on the line 13—13 of Fig. 4.

Fig. 14 is a fragmentary transverse vertical section through the core transfer means taken on the line 14—14 of Fig. 4.

Fig. 15 is a section through the jaws of the core holder at the core feed station showing the head of the spinner in engagement with the core.

According to the present invention, the spool cores are fed to and supported by one rotatable carrier and the spool flanges are fed to and supported by another rotatable carrier. Said carriers are intermittently rotated and are timed to provide a stationary interval with a core and a pair of flanges in alignment at an assembly station. During this stationary interval of the carriers, the cores are fed to and positioned in one carrier at a core feed station, the flanges are fed to the other carrier at a flange feed station, the welding operation takes place at the assembly station, and a delivery mechanism operates to remove the finished spool from the machine at a spool delivery station. Each of the operations just mentioned is more fully described hereinafter.

Figure 2:
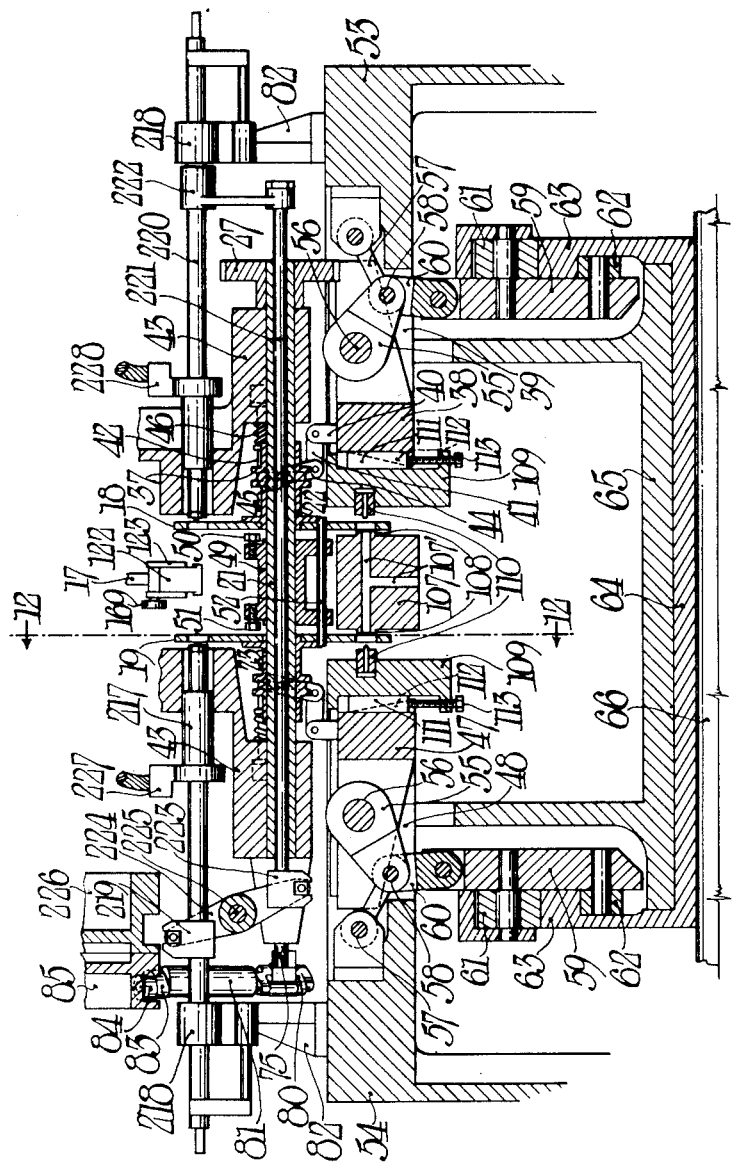
Fig. 2 is a fragmentary vertical cross-section and illustrates the flange preparation and the welding mechanism.

The rotatable carrier for the cores comprises a body 15 which is mounted upon a shaft 16 and which supports a plurality of core holders 17, while the second rotatable carrier for the flanges comprises a pair of disks 18 and 19 which each support a plurality of clutch elements 20 for engaging the flanges and which are each mounted upon a sleeve 21, see Fig. 2, by means of a pair of bushings 22 and 23.

The shaft 16 for supporting the core carrier is supported at one end by a bearing 24 and at the other end by a bearing sleeve 25 both of which are affixed to or form part of the frame of the machine.

An interconnecting means is provided between the two rotatable carriers for simultaneous movement thereof. Such an interconnecting means may be any suitable arrangement such as the chain drive shown and comprising a sprocket 26 affixed to shaft 16, a sprocket 27 affixed to sleeve 21, and a chain 28 which encircles said sprockets 26 and 27. In the illustrated embodiment the rotatable carrier for the flanges has twice as many clutch elements as there are core holders on the other rotatable carrier so that the ratio of sprocket 26 to sprocket 27 is such that sprocket 26 rotates twice for every revolution of sprocket 27.

The power drive for the rotatable carriers is intermittent so that stationary intervals of the carriers are provided. The preferred form of power drive is a Geneva movement which has been illustrated, see Figs. 1 and 3, as comprising a power driven counter shaft 29, a driving member 30 on shaft 29, a driving pin 31 and a shoe 32 on said driving member 30, and a star wheel 33 which is formed in the rear surface of body 15 of the core carrier. The counter shaft 29 is driven by a main shaft 34 in timed relation thereto by means of any suitable connection such as a pair of intermeshing gears 35 and 36 which are mounted on main shaft 34 and counter shaft 29, respectively. The main shaft 34 is rotated by any suitable prime mover (not shown).

The automatic feeding and preparation of the flanges to the corresponding rotatable carrier is now to be described with respect to Figs. 2 and 12.

During the stationary interval provided by the intermittent power drive, the flange carrier is reciprocated in an axial direction by an actuating means. Disk 18, forming one flange carrier, is mounted on bushing 22 which is provided with an annular groove 37. The actuating means for this carrier comprises a block 38 movable within a slide 39, a post 40 mounted on block 38, a link 41 pivoted to post 40, a stud 42 mounted on electrode support 43, and a second link 44 pivoted between stud 42 and link 41. The link 44 carries a pin 45 which engages the groove 37 of bushing 22. The stud 42 is slidably mounted in electrode support 43 and is biased by a coil spring 46 to an extended position. A similar linkage system is provided to transmit the motion from block 47, which is movable in slide 48, to the bushing 23 supporting disk 19, but is not particularly described because of the similarity.

An adjustable stop means for limiting the axial movement of the disks 18 and 19 may comprise a bushing 49 on sleeve 21 between disks 18 and 19 and a pair of set screws 50 and 51 threaded into opposite ends of bushing 49 and adapted to abut the disks 18 and 19, respectively, in the forward positions thereof. A rod 52 is supported by bushing 49 and slidably engages disks 18 and 19 to permit axial but to prevent rotatable relative movement therebetween.

The slides 39 and 48 for the respective blocks 38 and 47 are provided, respectively, in frame members 53 and 54. The blocks 38 and 47 are reciprocated by mechanisms which are similar so that only one of them is described. A toggle linkage, see Fig. 2, includes an arm 55 which is journaled to a pin 56 on the block 38 or 47 and incudes a link 57 which is pivoted to the frame member 53 or 54 and to one end of arm 55 by a rod 58. A cam follower 59 is connected to rod 58 by a link 60 and rotatably supports a pair of rollers 61 and 62 which engage the respective outer and inner surfaces of a cam 63. The cam 63 is mounted on a sleeve 64 which is rotated within a central frame member 65 by a power driven shaft 66. The formation and relative timing of the cam 63 is indicated in column VII of the cam time chart of Fig. 11.

Upon rotation of power driven shaft 66, the blocks 38 and 47 are moved back and forth and the disks 18 and 19 are reciprocated on sleeve 21 to forward and retracted positions. The stud 42 and the coil spring 46 form a resilient connection for one end of link 44 so that any additional movement of blocks 38 and 47 after disks 18 and 19 abut set screws 50 and 51 is taken up by said resilient connection.

The flange blanks are supplied in the form of flat circular disks 67 each provided with a central hole 68, see Fig. 7. Said flange blanks 67 are stacked within vertical flange feed tubes 69, see Fig. 3, and are fed one at a time from the bottom of these stacks by any suitable mechanisms, only one of which is shown. Such a feeding mechanism may comprise a slide 70 which is moved back and forth within a slideway 71 by means of a reciprocating connecting rod 72 in turn driven by a cam means designed to correspond to column VI of Fig. 11. The slide 70 pushes the individual flange blanks into the top of the flange chute 73 which is preferably composed of non-magnetic material and which conducts the flange blanks to the flange feeding station, see Figs. 5 and 6.

The purpose of the flange feeding station is to effect the location of the flange blanks in the flange carrier or disks 18 and 19 during the stationary interval of the intermittent power drive for said carrier and while said disks 18 and 19 are in forward position.

The flange feeding means is primarily composed of a plunger axially movable to carry a flange blank into engagement with a clutch element of the rotatable carrier. In the particular adaptation of the present invention a pair of plungers 74 and 75 are used and are mounted for axial sliding movement in respective supports 76 and 77. A rod 78 is attached to plunger 74 by means of a connector 79 and is also axially slidable within the supports 76 and 77.

The reciprocation of plungers 74 and 75 is accomplished by an actuating means which is timed to move said plungers to forward positions during the forward positions of disks 18 and 19. Such an actuating means may comprise a crank member 80 which is rotatably mounted in a sleeve 81 on a standard 82, is pivotally connected to the adjacent ends of plunger 75 and rod 78, and has a crank arm 83 for rotatably supporting a cam follower 84. Said actuating means also includes a cam member 85, see Fig. 2, which is adapted to impart a rocking motion to the crank member 80 so that rotation in one direction moves plungers 74 and 75 toward each other while rotation in the other direction moves said plungers away from each other. The contour and timing of cam member 85 is indicated in column V of the time chart of Fig. 11 and is seen to be very similar and timed with respect to cam 63, see column VII, for moving the disks 18 and 19 to forward position so that the plungers 74 and 75 are in forward position when disks 18 and 19 are also in forward position.

The flange supply means includes the flange chutes 73 into which the flange blanks are fed by the slides 70 and also includes holders 86 which are attached to supports 76 and 77. The holders 86 are provided with semi-cylindrical grooves in which the plungers 74 and 75 reciprocate and also have collars 87, see Fig. 6. A stripper means for the flange feeding plungers preferably comprises a pair of pawls 88 which are pivotally mounted on each holder 86 by bolts 89 and which are biased to abut collar 87 by means of a coil spring 90. The free ends of pawls 88 are inclined and are spaced so that a flange blank may be moved through them by one of the plungers 74 or 75 but will be stripped from the plunger during its return movement.

A guard means is located in axial alignment with plungers 74 and 75 to supervise the location of the flange blanks in the disk carriers 18 and 19, and, by way of example, is illustrated as including a bracket 91 attached at one end to the machine and supporting at the other end a cross rod 92. The cross rod 92 supports a pair of sleeves 93 on each end, is provided with a pair of slots 94 for cooperating with pins 95 on each of sleeves 93 to limit the axial movement thereof, and is encircled by a pair of coil springs 96 which hold sleeves 93 in extended position with pins 95 against the opposite ends of slots 94. The rod 78 also slides in the bracket 91.

The clutch elements 20 which are provided for the flange carrier are now to be particularly described with respect to Fig. 7. A ring 97 is provided with a peripheral groove 98. A plurality of engaging means are spaced around the ring and may include pins 99 each of which has at one end a pair of teeth 100 and 101 and each of which are provided at the other end with a groove 102. A circular coil spring 103 is located within pheripheral groove 98 and urges the engaging means toward the center of the ring 97 but a shoulder 104 is provided on each pin 98 to limit the radial movement under the action of spring 103. The teeth 100 and 101 on the engaging means each have one side sloping in the same direction, the slope on tooth 101 being steeper than on tooth 100. The pins 99 are located in said ring 97 with the inclined sides of the teeth 100 and 101 facing to engage the flange blank as it is fed thereto by the plungers, in the example shown by plunger 74. The teeth 100 and 101 also have perpendicular surfaces which are opposite the inclined surfaces and which will act as strippers if the flange blank for any reason tends to stick to plunger 74.

The ring 97 is threaded for attachment to the disks 18 or 19 and is provided with holes 105 for facilitating removal of said clutch elements. Locating pins 106 are inserted into the end of the plungers 74 and 75.

The flange blanks 67 are inserted into the flange carrier in the following manner. The slides 70 feed the flanges 67 from the bottom of the stacks in flange feed tubes 69 into the flange chutes 73. The flanges 67 are conducted in pairs into a position best shown in Fig. 6 and in which they rest upon holders 86 and in which they are maintained in upright position by collars 87 and pawls 88. Upon actuation of the crank member 80 by the cam member 85, the plungers 74 and 75 are moved toward each other, the locating pins 106 on the plungers 74 and 75 enter the central hole 68 in the flange 67, the pawls 88 are cammed outwardly against the action of coil springs 90, and the flanges 67 are carried by plungers 74 and 75 into engagement with the engaging means of the clutch elements 20 on the disks 18 and 19. In the meantime the disks 18 and 19 have been moved toward each other to abut the adjustable stop means and to move clutch elements 20 into cooperative relationship with the guard means. The plungers 74 and 75 move the flanges 67 into abutment with the sleeves 93 of the guard means and into engagement with the inclined surfaces of the engaging means of the clutch element causing movement of pins 99 against the action of spring 103. In proper location of the flange 67, the engaging means of the clutch means prevents easy or accidental removal of the flange 67 therefrom. The plungers 74 and 75 are then returned to restracted positions under the supervision of cam member 85 and if for any reason, a flange should stick to the locating pin 106 or either of the plungers 74 and 75, the pawls 88 under the action of coil spring 90 would knock the flanges from the plunger so that no damage could result to the machine by such abnormal condition.

The entire loading cycle as just described takes place during the stationary interval of the intermittent power drive for the flange carrier. During the succeeding cycles the flange carriers are intermittently rotated to bring the flanges into one or more preparatory stations at which the flanges may be stamped, deformed and slotted before movement to the assembly station.

A pair of punch presses for preparation of the flanges are operated by the actuating means for the flange carriers. One or more sets of dies are operated by said punch presses and such dies may be provided and arranged in various combinations. As shown in Fig. 2, an anvil 107 is provided with a pair of stationary dies 108 and a pair of movable die blocks 109 are provided with dies 110 which are complementary to stationary dies 108. The set of dies 108 and 110 may be of standard construction and their design to perform the various operations, namely, slotting, embossing and deforming, requires only the skill of a tool maker. The movable die blocks 109 are adapted to reciprocate with the blocks 38 and 47 but are relatively movable with respect thereto by means of adjustable connections 111 each of which includes a wedge 112 operated by a bolt 113 threaded in block 109 and swiveling in wedge 112. Prior to each punching or forming operation, the disks 18 and 19 are moved axially by reciprocation of blocks 38 and 47 so that the flanges which have been loaded into the clutch element 20 of said disks are moved adjacent the stationary dies 108 on the anvil 107. At the same time the movable die blocks 109 are moved toward the disks and dies 110 enter the openings in clutch elements 20.

The forward positions of disks 18 and 19 are controlled by the adjustment of set screws 50 and 51 so that the flanges 67 in disks 18 and 19 are in proper relation to the stationary dies 108 while the extreme positions of dies 110 are controlled by regulation of the adjustable connections 111 so that the dies 108 and 110 may cooperate properly to perform the particular punching operation on the flanges 67.

A passage 107' is provided in anvil 107 and is adapted to conduct the flange cut-outs away from the dies. A negative pressure may be preferably created within passage 107' to facilitate its operation as a conduit for flange cuttings to waste.

While the dies 108 and 110 can be designed to perform the slotting, embossing and dishing of the flanges in a single operation, it is preferable to accomplish the flange preparation in more than one step. In Fig. 12, the preferred form of location and design of the dies for forming the flanges are shown. In this form of punch press a pair of movable dies 114 and 115 are appropriately mounted and located on each movable die block 109 so that upon axial movement of the disks 18 and 19 the dies 114 and 115 enter the openings in two of the clutch elements 20. The flange blanks 67 have been omitted in Fig. 12 from the clutch elements opposite the dies 114 and 115 for better illustration of the forming elements of said dies. The movable die 114 has a locating pin 116, a pair of slotting fins 117, and embossed characters 118. The movable die 115 also has a locating pin 119 and has a convex end with a plurality of pimples 120 in quadrature thereon so that the flange is dished and provided with a plurality of dimples by the action of this die. Complementary stationary dies, similar to stationary die 108 are provided on the anvil 107 for cooperation with the movable dies 114 and 115 just described.

The preferred steps of flange preparation are now to be described. The flange blank 67 has been located in the clutch elements on the flange carrier as previously described and during the same cycle is rotated a distance equal to the spacing of clutch elements 20. During the stationary interval of the next cycle of machine operation, the slotting fins 117 and embossed characters 118 accomplish slotting and stamping of the flange blank whereupon the slotted and embossed flange 67' is moved to a position opposite movable die 115. The convex end and pimples 120 thereon of movable die 115 complete the preparation of flange 67' by dishing and providing projections in the same. The form of the flanges just prior to the welding operation is also shown in Jones Patent No. 1,754,205 and in our copending applications for a Method of welding spools, Serial No. 683,154, and for an Electric welding machine for all-metal spools, Serial No. 683,155 both filed on even date herewith. The advantages and purposes for certain of the formings on the flanges are also set forth in said patent and applications. The formed flanges remain in the flange carriers and are rotated at intervals until they arrive at the assembly station in alignment with the cores in the core holders 17 of the other rotatable carrier.

The feeding and movement of the spool cores to the assembly station is described in the following. The core holders 17 on the body 15 are each composed of a pair of jaws, a stationary jaw 121 and a movable jaw 122 which is mounted on a plate 123 pivoted to stationary jaw 121 by means of a bolt 124. The jaws 121 and 122 in the case of each core holder 17 are biased to closed position by a coil spring 125 which is connected between said plate 123 and the body 15. The jaws 121 and 122 are provided with semi-cylindrical grooves which form a cylindrical receptacle for the spool cores when the jaws are in closed position. A pair of pins 126, see Fig. 15, are mounted in the groove of either jaw, preferably the movable jaw 122, and co-operate with slots in the spool core in a manner to be explained hereinafter.

The delivery of the spool cores to the core holders 17 of the rotatable core carrier is accomplished by a core feed hopper and a transfer means for moving the cores individually from said hopper to a position between jaws 121 and 122.

The core feed hopper, see Fig. 13, includes a trough 127 which has a width corresponding to the length of the cores and includes a vertical guideway 128 in which the cores 129 are stacked one above the other. Movement of the cores from the trough 127 to the guideway 128 is facilitated by reciprocating a plate 130 which is in the bottom of trough 127. Said plate 130 is supported at one end upon a roller 131 and at the other end by a bracket 132 which is journaled upon a cam 133 eccentric to a rotating shaft 134. The trough 127 and the vertical guideway 128 are supported by a central web 135 which is connected to an arbor 136 that is attached to a lug 137, see Fig. 4, on the frame of the machine. The shaft 134 is rotatably mounted along the side of the machine and is rotated from the main shaft 34 through a gear train which includes the pinion gears 138 and 139.

The tubes 129 are supported in guideway 128 by a plate 140, see Fig. 13, which is fastened to central web 135 by a bolt 141. A pawl 142 is pivoted to plate 140 by a pin 143 and has a counterweight 144 and a lug 145. A spring pressed pin 146 is slidable within plate 140 and abuts the lug 145 so that pawl 142 is normally held in position to prevent tubes 129 from falling out of guideway 128. A cam surface 147 on pawl 142 is normally held against the lowermost tube in guideway 128 by the counterweight 144 and pin 146 to prevent the weight of the superjacent tubes from moving said lowermost tube out of the guideway.

The transfer means includes a shaft 148 and a pair of sectors 149 and 150 mounted in spaced relation on said shaft 148. The sectors 149 and 150 may be clamped to shaft 148 as by means of a set screw 151, see Fig. 13. The sectors 149 and 150 are axially spaced on shaft 148 at a distance slightly greater than the length of a core 129. Core grippers are provided on each of sectors 149 and 150, are adapted to resiliently engage the ends of a core 129, and may be composed of pins 152 which are slidably mounted in said sectors and normally maintained in extended position by a spring 153, see Fig. 4.

The shaft 148 is supported along the side of the machine by a pair of bearings 154 on the machine and at one end by a yoke 155, the other end of shaft 148 has a pinion 156. The shaft 148 is rotated in timed relation to the power drive, first a fraction of a revolution in a counterclockwise direction, see Fig. 13, for movement of a core 129 from vertical guideway 128 to a position between jaws 121 and 122 and then in a clockwise direction to its original position so that gripper pins 152 engage the ends of the lowermost core 129 in said guideway 128. The means for rotating the sectors 149 and 150 of the transfer means comprises a counter shaft 157 rotatably supported in bearings 158, a pinion 159 on shaft 157 and in mesh with pinion 156, a rack 160 slidable in a guide 161 on frame 162 and in mesh with a pinion 163 on counter-shaft 157, and a cam member 164, see Fig. 14, for reciprocating rack 160 and mounted upon the main shaft 34. The rack 160 is movably supported from a bracket 165 on the back of frame 162 and by a link 166 pivoted at one end to said bracket 165 and at the other end to one end of the rack 160 by a pintle 167. A cam follower in the form of a roller 168 is mounted on the end of pintle 167 and moves in a cam slot 164' of said cam member 164. The complete contour and the relative timing of the cam 164 is shown by column VIII on the time chart of Fig. 11.

The jaws 121 and 122 of the core holders 17 are operated at the core feed station during the stationary interval of the rotatable carrier for the cores and in timed relation to the transfer means. For this purpose each core holder has a roller 169 on the plate 123 which also carries the movable jaw 122. An actuator controls the movement of said movable jaw 122 and includes, see Fig. 1, an arm 170 which is adapted to engage the roller 169 of the core holder at the core feed station, a shaft 171 rotatably mounted on said machine and connected at one end to said arm 170 and at the other end to a segment 172, a cam member 173 on the main shaft 34 of the machine, and a link 174 which may be intermediately provided with a turnbuckle 175, which is pivotally connected at one end to segment 172 by a pintle 176, and which supports at its other end a cam follower 177 adapted to engage the periphery of cam member 173. A coil spring 178 is fastened to segment 172 and normally maintains cam follower 177 against the periphery of cam 173 which has a contour and is relatively timed to the other mechanisms according to the chart in column IX of Fig. 11.

The spool core 129 is preferably formed in the manner disclosed in the patent to Chamberlin No. 1,648,539 and is accordingly provided with a slot 179 at the seam of the core, see Fig. 15, and with a slot 180 which is diametrically opposite slot 179 and which is wider and shorter than said slot 179. The cores pass through the core feed hopper and are moved by the transfer means to a position between the jaws 121 and 122 without regard for the location of the slots 179 or 180 with respect to the remainder of the machine.

The existence of a predetermined relationship in the finished spool between the slots in the flanges and the slots in the core is necessary in view of the subsequent spooling of photographic film onto the spools. The provision in the flanges of slots which are in definite relation to the carrier for the flanges has already been described. The location of the core with the slots therein in definite relation to the rotatable core carrier is to be next explained.

The core 129 is positioned between the jaws 121 and 122 by the transfer means. The jaws 121 and 122 are biased to closed position but the pins 126 in the semi-cylindrical groove of the movable jaw 122 prevent the jaws from assuming the closed position unless the core is in proper position with the pins 126 extending either into slot 179 or slot 180. In the illustrated embodiment of the invention, see Fig. 15, the pins 126 are spaced apart a distance which is greater than the length of slot 180 but less than the length of slot 179. Rotation of the core within the jaws will move the core 129 until the pins 126 enter the slot 179 but at the same time the pins 126 can not enter slot 180 because of the particular spacing of said pins 126. Such rotation of the core is accomplished by means of a spinner which is axially movable to engage and rotate the core and which is provided with a stripper for disengaging said core and spinner upon retraction of the spinner.

The spinner comprises a head 181 which has a knurled pin 182 adjustably attached thereto by a pair of lock nuts 183, see Fig. 15. The head 181 is mounted on the end of a shaft 184 which is rotatably supported along the side of the machine in the frame 162 by a bearing 185 thereon and which is mounted for axial movement. The shaft 184 is continuously rotated by means of pinion gear 139 which is driven, as before mentioned, through a suitable gear train by the main shaft 34 and which meshes with an elongated pinion 186 on shaft 184. A collar 187 is pinned to shaft 184 and is provided with a peripheral groove 188. A yoke member 189 is intermediately pivoted to the frame 162 by a pin 190, supports at one end a pair of rollers 191 which engage the groove 188 of collar 187, and supports at the other end a cam follower 192 which engages a slot 193 in the periphery of a cam 194 on the main shaft 34. The contour of cam 194 and the timing of the axial movement imparted to shaft 184 is indicated in column X of Fig. 11. Since the end thrust of the spinner may cause axial movement of the cores 129 between jaws 121 and 122, the sector 149 is formed to be adjacent the end of core 129 during its engagement with the spinner. The cam 164 for rotating the shaft 148 returns sector 149 to the position shown in Figs. 13 and 15 to abut the end of core 129 before the cam 194 has axially moved shaft 184 to bring knurled pin 182 into engagement with the core 129 between the jaws 121 and 122. This relative timing of cams 164 and 194 is also indicated by comparison of the time charts for these cams in columns VIII and X, respectively, of Fig. 11.

A stripper is provided on the end of the spinner and functions to extract the knurled pin 182 of the spinner from the engagement with the inside of core 129 after proper location thereof between the jaws of core holder 17. Such a stripper may comprise a cap 195 which is slidably mounted on head 181 and which is movable in extreme positions to cover or expose the knurled pin 182 of the spinner. A coil spring 196 encircles head 181 and normally maintains cap 195 in position to cover pin 182. Upon axial movement of the spinner toward the core, cap 195 abuts the end of core 129, see Fig. 15, and further axial movement of the spinner by cam 194 thrusts the pin 182 through cap 195 into engagement with the interior of core 129.

The Geneva movement, the cam 164 of the transfer means and the cam 173 of the actuator for the jaws 121 and 122, are in timed relation so that during the first part of the stationary interval the jaws 121 and 122 are maintained in open position by the actuator, compare columns II, VIII and IX. With the jaws 121 and 122 in open position, the cam 164 turns the transfer means to carry a core to a position between the jaws and before return of the transfer means, the actuator for the jaws permits the jaws 121 and 122 to close or only partially to close if pins 126 do not happen to enter slot 179. The transfer means returns to original position. The spinner is moved into engagement to rotate the core and is then retracted. All of these movements take place during the stationary interval provided by the Geneva movement for the core carrier. Hence a core 129 is fed and located in a core holder 17 at the core feed station during each cycle of the machine. The actuator permits the jaws 121 and 122 to remain biased to closed position until after the core holder has been moved from the core feed station and away from the influence of the actuator.

The rotatable carrier for the cores is turned by the Geneva movement so that the core holders 17 are located at the core feed station, the assembly station, and a spool delivery station during the stationary interval of the intermittent power drive. The steps of feeding the cores at the core feed station and of locating the cores with their slots in proper relation to the carrier have just been described. The core holder 17 with the properly positioned core is then rotated until the core holder arrives at the assembly station. The rotatable carrier for the flanges at the same time carries a pair of flanges with slots therein in definite relation to the carrier into alignment with the core in the core holder at the assembly station.

The alignment of the core and flanges obtained by the intermittent power drive may not be absolutely accurate so that it is necessary to employ an auxiliary means, such as an indexing means, for accurate alignment of the core and flanges at the assembly station. For the purpose of indexing the carriers, the stationary jaws 121 of the core holders 17 are provided each with an auxiliary jaw 197 which is provided with a notch 198. The discs 18 and 19, forming the flange carrier, are provided with peripheral notches 199.

A shaft 200 is supported by the machine and in turn supports a bell crank 201 and a second bell crank 202. The bell crank 201 has at the end of one arm a tooth 203 which is adapted to engage the peripheral notches 199 of the flange carrier. A coil spring 204 is connected between the other end of bell crank 201 and an anchor 205 on the machine. A tooth 206 is located on one end of bell crank 202 and is adapted to engage the notch 198 of the auxiliary jaw 197. An arm 207 is mounted upon a shaft 208 on the machine and rotatably supports a cam follower 209 which engages the periphery of a cam 210 mounted on the main shaft 34. A second arm 211 is also mounted upon shaft 208. A link 212 is pivotally connected between the arm 211 and the other end of bell crank 202 and is compressible against the action of a coil spring 213. The bell crank 202 has a lug 214 which is adapted to be engaged by an adjustable pin 215 which is mounted in a bushing 216 on bell crank 201.

Figure 1:
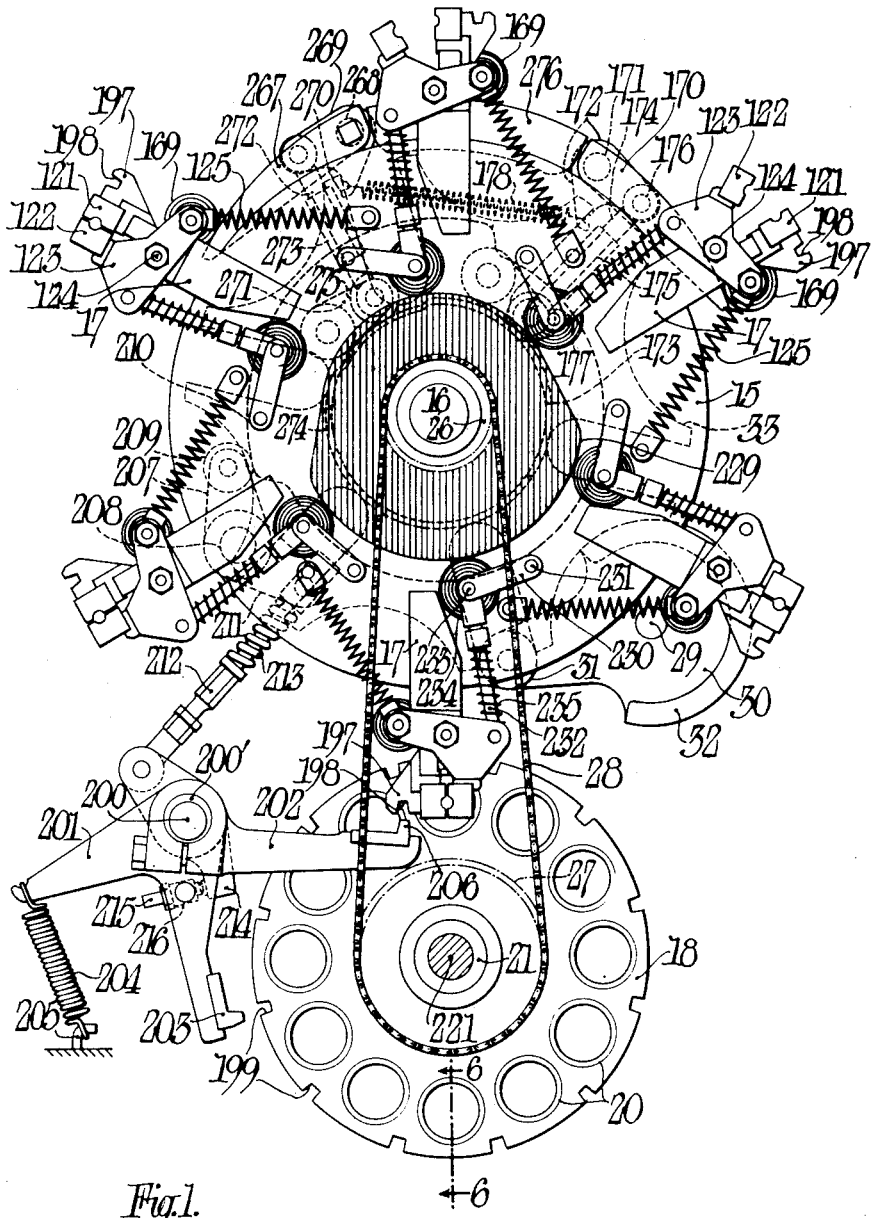
Fig. 1 is a fragmentary end elevation and illustrates the rotatable carriers for the spool cores and flanges.

The contour of cam 210 is illustrated in Fig. 1 and in column III of Fig. 11, while the relative timing of this cam 210 with respect to the other cams of the machine is indicated in Fig. 11. Immediately after the arrival of a core holder 17 at the assembly station for a stationary interval, the cam 210 moves cam follower 209 so that the link 212 is moved to bring the teeth 203 and 206 on respective bell cranks 201 and 202 into engagement with the notches 199 and 198, respectively. If there is any over-travel due to the dwell in the cam 210 or if either of the teeth 203 or 206 do not properly engage in their respective notches 199 and 198, the coil spring 213 is compressed to compensate for this abnormal condition.

Upon proper location of the teeth 203 and 206 in their respective notches, the flange carriers 18 and 19 and a core holder 17 are accurately positioned at the assembly station with the flanges 67 and a core 129 in substantially perfect alignment. An adjusting arrangement for the indexing means may comprise an eccentric sleeve 200' which may be inserted between shaft 200 and bell cranks 201 and 202 so that engagement of teeth 203 and 206 with respective notches 199 and 198 may be regulated by relative rotation of sleeve 200'.

During the stationary interval with the flanges and the core properly aligned at the assembly station, the welding electrodes are operated to move the flanges into abutment with the ends of the core and to effect the welding of the flanges to the core. This operation of the electrodes is also disclosed in our aforementioned co-pending application for an Electric welding machine for all-metal spools, but will be briefly described at this time. As shown in Fig. 2, an electrode 217 is slidably mounted in the electrode support 43 and a bushing 218 on the top of standard 82. A jaw 219 is intermediately positioned on electrode 217. A second electrode 220 is slidably supported in the opposite electrode support 43 and bushing 218 on a standard 82. A rod 221 extends through sleeve 21 and is connected at one end by a connector 222 to electrode 220 and supports at the other end a jaw 223. A rocker arm 224 is rotatably mounted on a shaft 225 and is pivotally connected at each end to the jaws 219 and 223. A cam 226 has a contour corresponding to the time chart of column IV in Fig. 11 and rocks the rocker arm 224 through a connection, not shown in this application but fully described in our co-pending application just mentioned.

Rotation of the rocker arm 224 in a clockwise direction as viewed from Fig. 2, causes electrodes 217 and 220 to move toward each other. Upon such movement, the electrodes pick up the flanges which are held in the clutch members of discs 18 and 19 and carry them to positions adjacent the ends of the core in core holder 17. A conductor bushing 227 is attached to electrode 217 and a second conductor bushing 228 is attached to electrode 220. A welding current is supplied through bushings 227 and 228 to the electrodes 217 and 220 in the manner disclosed in our co-pending application. After the welding operation has been performed, the cam 226 retracts the electrodes 217 and 220 and permits further rotation of the flange carriers 18 and 19.

Since the core in the core holder at the assembly station is subjected to various strains and stresses, especially during the welding operation, it has been found advisable to provide auxiliary clamping means for squeezing the jaws 121 and 122 together. Such a clamping means may be composed of a stationary cam 229 and a linkage which is connected to the movable jaw 122. Specifically, the linkage comprises an arm 230 which is pivoted to the body 15 by a pin 231, a link 232 which is pivotally connected at one end to the plate 123 of the core holder 17 and at the other end to the free end of arm 230 by a rod 233, and a roller 234 which is mounted upon rod 233 and which is adapted to engage the periphery of stationary cam 229. A coil spring 235 encircles link 232 normally to hold the roller 234 in contact with the periphery of cam 229. Consequently, as the core holder 17 is rotated from the core feed station, the roller 234 rides up on the rise of cam 229 and compresses spring 235 and jaws 121 and 122 are squeezed tightly together.

For proper cooling of the welded spool, the pressure created by the stationary cam 229 is maintained for some time after the core holder leaves the assembly station, but is relieved prior to the arrival of the core holder at a spool delivery station which will be described next.

The spool delivery station is illustrated in Figs. 8, 9 and 10. The core holders 17 are rotated from the assembly station to the spool delivery station by the Geneva movement which also provides a stationary interval for the core holder at the delivery station. The path of the carrier is indicated by the dotted arc of Fig. 9, while the path of the core carried by the core holder is indicated by the dot-dash arc of Fig. 9.

The spool delivery mechanism is mounted along side of the machine upon a frame 236. A shaft 237 is supported by bearings 238, which are mounted in frame 236. Adjacent the spool delivery station, the shaft 237 supports a pair of members for engaging the finished spool in the core holder 17. Such members 239 are slidably mounted on shaft 237, are each provided with arms 240 having pins 241 to enter the interior of the spool core and are normally drawn together by a coil spring 242.

A collar 243 is fastened to shaft 237 and supports a linkage comprising an arm 244 pivoted to collar 243 and links 245 between the ends of arm 244 and the respective members 239. A yoke member 246 includes a pair of rods 247 which are connected to one of the members 239. A spindle 248 extends through the interior of shaft 237 and is adapted to engage a pin 249 on the yoke member 246.

The members 239 and arms 240 of the delivery mechanism are normally held in closed position by the coil spring 242 but upon axial movement of the spindle 248 and within shaft 237, the yoke member 246 moves one of members 239 to open position and the other member 239 is also moved to open position through the medium of arm 244 and links 245. A cam means controls the axial movement of spindle 248 and includes a cam member 250 which is mounted on the main shaft 34 and a rocker arm 251 which is intermediately pivoted to frame 236 by a pin 252, which carries, at one end, a lug 253 for engaging the end of spindle 248 and which carries, at the other end, a cam follower 254 for engaging the face of cam member 250. The contour of cam member 250 is indicated in column XII of Fig. 11, from which it will be noted that the pins 241 of the arms 240 on the delivery mechanism grip and release the finished spool all during the stationary interval of the intermittent power drive for the core carrier.

The delivery mechanism also includes an actuating means for rotating the shaft 237, first in one direction for a fraction of a revolution and then in an opposite direction. The actuating means comprises a cam 255 which is mounted on main shaft 34, a gear segment 256 which is rotatably supported by the frame 236 and a pinion gear 257 which is pinned to shaft 237. The cam 255 is provided with a slot 258 for imparting the movement indicated in column XIII of Fig. 11 to the gear segment 256. The connection for transmitting the cam motion includes an arm 259 pivoted in a bracket 260 on frame 236, see Fig. 10, and a link 261 pivotally connected to the free end of arm 259 and to the gear segment 256.

From a comparison of columns XII and XIII of Fig. 11, it will be noted that when the delivery mechanism is in the position shown in Fig. 9, the arms 240 are first separated, at which time the finished spool is moved to the core delivery station, then the spool is gripped by arms 240 and the members 239 are rotated for a fraction of a revolution by the cam 255 and gear segment 256. Such rotation removes the finished spool from the core holder 17 and then the cam 250 imparts, through rocker arm 251, axial movement of spindle 248, so that the arms 240 are separated and the spool released.

An adjustable stop means may be provided for accurately controlling the rotation of shaft 237, and may comprise, see Fig. 10, a winged sector 262 which is attached to shaft 237 and which supports a pair of bushings 263 for the support of a pair of set screws 264. One of set screws 264 is adapted to abut a lug 265 on the frame 236 for limiting the rotation of shaft 237 in one direction while the other set screw 264 is adapted to abut the frame 236 for limiting rotation of shaft 237 in the reverse direction. The link 261 is compressible against the action of coil spring 266 in order to take up any excess motion imparted by the cam 255 after set screw 264 has come in contact with lug 265.

An actuator for controlling the positions of the jaws comprising the core holder 17 operates in timed relation to the spool delivery mechanism just described. Such an actuator comprises an arm 267, see Fig. 1, mounted on the end of a shaft 268 which is supported by the machine. A segment 269 is fastened to the other end of shaft 268 and includes a hook 270 for engaging the other end of the coil spring 178 which is connected to the segment 172 of the actuator previously described. An arm 271 is pivoted to the frame and to a link 272 which includes a turn buckle 273 and which is pivoted to the segment 269. A cam 274 is mounted on main shaft 34 and is adapted to engage a cam follower 275 which is rotatably mounted on a pivotal connection between arm 271 and link 272. The contour of cam 274 is indicated in column XI of Fig. 11 and is such that the jaws 121 and 122 of the core holder at the delivery station are first in closed position until gripped by the arms 240 and pins 241 of the delivery mechanism and said jaws are then opened for the remainder of the stationary interval of the core holder and for a portion of the rotating interval. The cooperation of the actuator and delivery mechanism is such that the cam 255 does not rotate the arms 240 until after the jaws 121 and 122 have been opened by the actuator. As before described, after the arms 240 are swung to move the finished spool from the core holder, then cam 250 operates the arms 240 for release of the spool.

The actuator for the jaws of the core holder at the delivery station returns to a position to permit the jaws of the next core holder to arrive at the delivery station in closed position during the next cycle. Furthermore, the jaws 121 and 122 are biased to closed position and move through an intermediate position, shown at the top of Fig. 1, before the core holder arrives at the core feed station. Accordingly a stationary rail 276 is attached to the machine and is adapted to engage the rollers 169 of the core holders to maintain the movable jaw 122 in open position during passage of the core holder through said intermediate position and during approach of the core holder to the core feed station.

A résumé of the operation of the machine will now be briefly set forth. The flange blanks 67 are fed to the disks 18 and 19 by the flange feeding mechanism described with reference to Figs. 5 and 6, the flanges being held in disks 18 and 19 by the clutch elements 20 specifically described with reference to Fig. 7. During the various stationary intervals of the disks 18 and 19, the flanges are embossed, slotted and deformed by dies carried on punch-presses including the movable blocks 38 and 47. The intermittent power drive then turns the disks 18 and 19 to bring a pair of flanges to the assembly station. The cores 129 are fed to the core holder by the transfer means and are registered within the jaws of the core holder by the spinner. The intermittent power drive simultaneously rotates the core carrier and flange carriers so that a core 129 is moved into alignment with the pair of flanges 67 at the assembly station.

The indexing means including bell cranks 201 and 202 now function and cooperate with a notch 199 in the flange carrier and a notch 198 on the core carrier accurately to align the flanges and the core. At this time, the electrodes 217 and 228 are operated to remove the flanges from disks 18 and 19 and to move said flanges into abutment with the ends of the core held by the core holder. Application of the welding current unites the flanges to the ends of the core. The jaws 121 and 122 are firmly clamped together by the action of the stationary cam 229 and the associated linkages. After retraction of the electrodes, the intermittent power drive again rotates the carriers and the finished spools are rotated into the spool delivery station. The arms 240 of the delivery mechanism grasp the ends of the spool, the actuator including arm 262 moves the supporting roller 169 to open jaws 121 and 122, the cam 266 causes rotation of the arms 240 to move the spool away from the jaws of core holder 17 and the cam 250 causes operation of arms 240, so that the finished spool is released and dropped into any suitable receptacle.

Since many modifications of the present invention will readily occur to those skilled in the art, the present disclosure is to be construed as illustrative and limited only by the scope of the appended claims.

Having now particularly described our invention what we desire to secure by Letters Patent of the United States and what we claim is:

1. In a machine for uniting flanges and a core to form a spool at an assembly station, the combination with a carrier for supporting a core which is provided with a slot, a mechanism for turning the core in said carrier definitely to position the slot in said core with respect to said carrier, a second carrier for supporting a flange, and a slotting mechanism for providing a slot in said flange in definite relation to said carrier, of a power drive for moving said carriers and for aligning the core and flange with the slots therein in predetermined relation at the assembly station.

2. In a machine for uniting flanges and a core to form a spool at an assembly station, the combination with a carrier for supporting a core which is provided with a slot, a mechanism for turning the core in said carrier definitely to position the slot in said core with respect to said carrier, a second carrier for supporting a flange, and a slotting mechanism for providing a slot in said flange in definite relation to said carrier and while supported thereby, of an intermittent power drive for moving said carriers and timed to stop said carriers when the core and the flange are in alignment and with the slots in the core and the flange in a predetermined relation to each other at the assembly station.

3. In a machine for joining flanges and a core to form a spool at an assembly station, the combination with a carrier having a plurality of clutch elements each for supporting a flange, and an intermittent power drive for rotating said carrier and timed to stop said carrier with a flange at said assembly station, of a slotting means for providing a slot in a flange in definite relation to said carrier while the carrier is stationary with another flange at said assembly station.

4. In a machine for joining flanges and a core to form a spool at an assembly station, the combination with a carrier having a plurality of clutch elements each for supporting a flange, and an intermittent power drive for rotating said carrier and timed to stop said carrier with a flange at said assembly station, of a slotting and deforming means for simultaneously providing a slot in a flange in definite relation to said carrier and for dishing the same flange while the carrier is stationary with another flange at said assembly station.

5. In a machine for joining flanges and a core to form a spool, the combination with a pair of carriers each mounted for rotatable movement and each having a plurality of clutch elements for engaging and supporting a flange, and an intermittent power drive for rotating said pair of carriers and for providing a stationary interval, of a feeding means including a pair of plungers each for carrying a flange into engagement with a clutch element on each carrier and operative during the stationary interval of said power drive.

6. In a machine for joining flanges and a core to form a spool, the combination with a pair of carriers each mounted for rotatable movement and each having a plurality of clutch elements for engaging and supporting a flange, and an intermittent power drive for rotating said pair of carriers and for providing a stationary interval, of a pair of plungers axially movable and each for carrying a flange into engagement with a clutch element on each carrier, and an actuating means for reciprocating said plungers in opposite direction and operative during said stationary interval.

7. In a machine for joining flanges and a core to form a spool, the combination with a pair of carriers each mounted for rotatable movement and each having a plurality of clutch elements for engaging and supporting a flange, a drive shaft, and an intermittent power drive actuated by said shaft, for rotating said pair of carriers and providing stationary intervals, of a feeding means including a pair of plungers each for carrying a flange into engagement with a clutch element on each carrier, and an actuating means for reciprocating said plungers in opposite direction and including a cam on said drive shaft and a connector between said cam and plungers, said cam being timed to operate said connector and plungers during a stationary interval of the carriers.

8. In a machine for joining flanges and a core to form a spool, the combination with a carrier mounted for rotatable movement and having a plurality of clutch elements each for engaging and supporting a flange, and an intermittent power drive for rotating said carrier and for providing a stationary interval, of a plunger axially movable and for carrying a flange into engagement with a clutch element on said carrier, a flange supply means for supporting a flange in the path of said plunger, a stripper means for permitting removal of a flange from said supply means by said plunger but preventing the return of said flange on said plunger to said supply means, and an actuating means for moving said plunger in timed relation to said intermittent drive and during a stationary interval thereof.

9. In a machine for joining flanges and a core to form a spool, the combination with a carrier mounted for rotatable movement and having a plurality of clutch elements each for engaging and supporting a flange, and an intermittent power drive for rotating said carrier and for providing a stationary interval, of a plunger axially movable and for carrying a flange into engagement with a clutch element on said carrier, a chute provided with an opening in the path of said plunger and in which a flange is supported, and actuating means for reciprocating said plunger during a stationary interval of the intermittent drive, and a pair of jaws adapted to be opened by movement of the plunger and a flange toward the carrier but normally held in a position to strip a flange from said plunger during the return movement.

10. In a machine for joining flanges and a core to form a spool, the combination with a carrier mounted for rotatable and axial movement and having a plurality of clutch elements each for engaging and supporting a flange, and a power drive for intermittently rotating said carrier, of a plunger axially movable and for carrying a flange into engagement with a clutch element on said carrier, an actuating means for reciprocating said plunger to forward and retracted positions, a second actuating means for reciprocating said carrier in an axial direction to forward and retracted positions, both of said actuating means being in timed relation to said power drive, and a guard means in alignment with said plunger and for cooperating with one of said clutch means and with said plunger in forward position thereof to supervise the location of a flange within said clutch element.

11. In a machine for joining flanges and a core to form a spool at an assembly station, the combination with a pair of electrodes axially movable along the axis of the assembly station, a rod connected to one of said electrodes and axially movable therewith, a sleeve on said machine for supporting and containing said rod, and a rocker member between the other electrode and said rod for moving said electrode in opposite direction, of a pair of carriers for supporting a pair of flanges in alignment with said electrodes at said assembly station and each being movably mounted on said sleeve.

12. In a machine for joining flanges and a core to form a spool, the combination with a carrier for supporting a flange and mounted for rotatable and axial movement, and a power drive for intermittently rotating said carrier, of an actuating means for reciprocating said carrier in an axial direction to forward and retracted positions and including a resilient connection, and an adjustable stop means for abutting said carrier in forward position and limiting the axial movement of said carrier, any additional movement of said actuating means being taken up in said resilient connection.

13. In a machine for joining flanges and a core to form a spool, the combination with a carrier for supporting a flange and mounted for rotatable and axial movement, and a power drive for intermittently rotating said carrier, of an actuating means for reciprocating said carrier in an axial direction to forward and retracted positions and including a resilient connection, a die fixed to said machine and located adjacent said flange during forward position of said carrier, and an adjustable stop means for abutting said carrier in forward position and supervising the axial movement of said carrier to move said flange into engagement with said die.

14. In a machine for joining flanges and a core to form a spool, the combination with a carrier mounted for rotatable and axial movement, and having a plurality of clutch elements for engaging and supporting a flange, and an intermittent power drive for rotating said carrier and providing intervals during which said carrier does not rotate, of an actuating means for reciprocating said carrier in an axial direction to a forward position, and a die fixed to said machine and located to abut the flange in said carrier in said forward position thereof.

15. In a machine for joining flanges and a core to form a spool, the combination with a carrier mounted for rotatable and axial movement, and having a plurality of clutch elements for engaging and supporting a flange, and an intermittent power drive for rotating said carrier and providing intervals during which said carrier does not rotate, of an actuating means for reciprocating said carrier in an axial direction to a forward position during the non-rotating intervals of said carrier, and a pair of dies for shaping the flange, one of which is fixed to said machine and the other of which is mounted to reciprocate with said actuating means, both dies engaging said flange during said intervals and forward position of said carrier.

16. In a machine for joining flanges and a core to form a spool, the combination with a carrier mounted for rotatable and axial movement, and having a plurality of clutch elements for engaging and supporting a flange, and an intermittent power drive for rotating said carrier and providing intervals during which said carrier does not rotate, of an actuating means for reciprocating said carrier in an axial direction to a forward position, and a pair of dies for cutting a slot in said flange, one of said dies being fixed on said machine and provided with a passage through which the flange cutout may be moved.

17. In a machine for joining flanges and a core to form a spool, the combination with a carrier mounted for rotatable and axial movement, and having a plurality of clutch elements for engaging and supporting a flange, and an intermittent power drive for rotating said carrier and providing intervals during which said carrier does not rotate, of an actuating means for reciprocating said carrier in an axial direction to a forward position, and a pair of dies for cutting a slot in said flange, one of said dies being fixed on said machine and provided with a passage in which a negative pressure is maintained for moving the cut-out scraps from the flange.

18. In a machine for joining flanges and a core to form a spool, the combination with a carrier mounted for rotatable and axial movement, and having a plurality of clutch members for engaging and supporting a flange, and an intermittent power drive for rotating said carrier and providing intervals during which said carrier does not rotate, of an actuating means for reciprocating said carrier to a forward position during said intervals and including a block, and a die on said block for engaging the flange in forward position of the carrier.

19. In a machine for joining flanges and a core to form a spool, the combination with a carrier mounted for rotatable and axial movement, and having a plurality of clutch members for engaging and supporting a flange, and an intermittent power drive for rotating said carrier and providing intervals during which said carrier does not rotate, of an actuating means including a reciprocating block and a plurality of links between said carrier and said block for moving said carrier to a forward position during said intervals, a pair of dies for shaping the flange, one of which is fixed to said machine and the other of which is connected to said block, and an adjustable connection between said other die and said block for varying the position of said other die with respect to said block.

20. In a machine for joining flanges and a core to form a spool, the combination with a carrier mounted for rotatable and axial movement, and having a plurality of clutch members for engaging and supporting a flange, and an intermittent power drive for rotating said carrier and providing intervals during which said carrier does not rotate, of an actuating means including a reciprocating block movable to a forward position, a plurality of links between said carrier and said block for moving said carrier to a forward position during said intervals, and a resilient connection for one of said links, a pair of dies for shaping said flange, one of which is fixed to said machine and the other of which is connected to said block, an adjustable stop means for abutting said carrier in forward position and limiting the axial movement of said carrier with said flange abutting the fixed die, and an adjustable connection between said other die and said block for varying the position of said other die with respect to the fixed die in the forward position of said block.

21. In a machine for uniting flanges and a core to form a spool at an assembly station, the combination with a carrier rotatably mounted and for supporting a core, a second carrier rotatably mounted and for supporting a flange, of an intermittent power drive for rotating one of said carriers and providing a stationary interval, an inter-connecting means between said carriers for simultaneous movement thereof and timed to align a core and a flange at said assembly station during a stationary interval, and an indexing means for positioning said carriers accurately to align said core and flange at said assembly station.

22. In a machine for uniting flanges and a core to form a spool at an assembly station, the combination with a carrier rotatably mounted and for supporting a core, and a second carrier rotatably mounted and for supporting a flange, of an intermittent power drive for rotating one of said carriers and providing a stationary interval, an inter-connecting means between said carrier for simultaneous movement thereof and timed to align a core and a flange at said assembly station during a stationary interval, and an indexing means for engaging said carrier during said stationary interval and for positioning said carrier accurately to align said core and flange at said assembly station.

23. In a machine for uniting flanges and a core to form a spool at an assembly station, the combination with a carrier rotatably mounted and for supporting a core, and a second carrier rotatably mounted and for supporting a flange, of an intermittent power drive for rotating one of said carriers and providing a stationary interval, an inter-connecting means between said carrier for simultaneous movement thereof and timed to align a core and a flange at said assembly station during a stationary interval, an indexing means biased to engage said carrier and for accurately aligning said core and flange at said assembly station, and an actuating means for permitting movment of said indexing means into engagement with said carrier during said stationary interval.

24. In a machine for uniting flanges and a core to form a spool at an assembly station, the combination with a carrier rotatably mounted and for supporting a core, and a second carrier rotatably mounted and for supporting a flange, of an intermittent power drive for rotating one of said carriers and providing a stationary interval, an inter-connecting means between said carrier for simultaneous movement thereof and timed to align a core and a flange at said assembly station during a stationary interval, an indexing means biased to engage said carriers and for accurately aligning said core and flange at said assembly station, and an eccentric adjusting means for varying the position of said indexing means with respect to said carriers.

25. In a machine for uniting flanges and a core to form a spool at an assembly station, the combination with a carrier rotatably mounted and for supporting a core, a second carrier rotatably mounted and for supporting a flange, and an intermittent power drive for rotating said carriers and for providing a stationary interval, of an indexing means adapted to engage said carriers with the flanges and core accurately aligned at the assembly station, and a cam means in timed relation to said intermittent power drive and for controlling the engagement of said indexing means.

26. In a machine for uniting flanges and a core to form a spool at an assembly station, the combination with a carrier rotatably mounted and having a core holder provided with a notch, and a second carrier rotatably mounted, for supporting a flange and provided with a notch, of an indexing means including a pair of teeth in definite relation to each other and each for engaging a notch on the respective carrier, an actuating means including a cam and a cam follower which is connected to said indexing means, and a resilient means for normally maintaining said indexing means in engagement with said carriers and said cam follower against said cam.

27. In a machine for uniting flanges and a core to form a spool, the combination with a pair of jaws which are biased to closed position for holding a core and which are movable to open position, and a carrier for said jaws and rotatable to move said jaws to a core feed station, of an intermittent power drive for said carrier and providing a stationary interval with said jaws at said core feed station, and an actuator including a movable arm for engaging one of said jaws and a cam which is in timed relation to said intermittent power drive, for operating said arm to open said jaws during approach to and part of the stationary interval at the core feed station and for operating said arm during the latter part of said interval and to permit the movement of said jaws to closed position.

28. In a machine for uniting flanges and a core to form a spool, the combination with a pair of jaws which are biased to closed position for holding a core and which are movable to open position, and a carrier for said jaws and rotatable to move said jaws to a spool delivery station, of an intermittent power drive for said carrier and providing a stationary interval with said jaws at said spool delivery station, and an actuator including a movable arm for engaging one of said jaws and a cam which is in timed relation to said intermittent power drive, for operating said arm to permit said jaws to remain closed during the first part of said stationary interval, and for operating said arm during the latter part of said interval to open said jaws.

29. In a machine for uniting flanges and a core to form a spool, the combination with a pair of jaws which are biased to closed position for holding a core and which are movable to open position, and a carrier for said jaws and rotatable to move said jaws to a spool delivery station, and intermediate position and to a core feed station, of an intermittent power drive for said carrier and providing a stationary interval with said jaws respectively at said spool delivery station, said intermediate position and at said core feed station, an actuator including an arm adapted to engage one of said jaws and a cam in timed relation to said power drive and for operating said arm to open said jaws at the spool delivery station during the latter portion of said stationary interval, a second actuator including a second arm also adapted to engage one of said jaws and a second cam also in timed relation to said power drive, for operating said arm to maintain said jaws open during approach to said core feed station and during the first part of said stationary interval and then operating said arm to close said jaws during the latter part of said stationary interval, and a stationary rail adapted to engage one of said jaws and for maintaining said jaws in an open position in their movement to and from said intermediate position and thereat.

30. In a machine for uniting flanges and a core to form a spool at an assembly station, the combination with a carrier rotatably mounted, a core holder on said carrier and including a pair of jaws which are biased to closed position, and an intermittent power drive for rotating said carrier and for providing a stationary interval for said carrier with said core holder at feeding and delivery stations and at said assembly station, of a cam means selectively operative on said core holder and adapted to exert an additional closing pressure on said jaws at said assembly station.

31. In a machine for uniting flanges and a core to form a spool at an assembly station, the combination with a carrier rotatably mounted, a core holder on said carrier and including a pair of jaws which are biased to closed position, and a power drive for rotating said carrier and for moving said core holder to and from said assembly station, of a cam means selectively operative on said core holder to exert an additional closing pressure on said jaws during approach to and retreat from said assembly station.

32. In a machine for uniting flanges and a core to form a spool at an assembly station, the combination with a carrier rotatably mounted, a core holder on said carrier and including a pair of jaws which are biased to closed position, and a power drive for rotating said carrier and for moving said core holder from said assembly station, of a cam means selectively operative on said core holder to exert an additional closing pressure on said jaws during movement of said jaws from said assembly station.

33. In a machine for uniting flanges and a core to form a spool at an assembly station, the combination with a carrier rotatably mounted, a core holder on said carrier and including a pair of jaws which are movable with respect to each other, and an intermittent power drive for rotating said carrier and for providing a stationary interval for said carrier with said core holder at said assembly station, of a linkage between said carrier and one of said jaws, and a stationary cam for engaging said linkage and exerting pressure to squeeze said jaws together while at said assembly station.

34. In a machine for uniting flanges and a core to form a spool at an assembly station, the combination with a carrier rotatably mounted, a core holder on said carrier and including a pair of jaws which are movable with respect to each other, and a power drive for rotating said carrier and for moving said core holder to and from said assembly station, of a linkage between said carrier and one of said jaws, and a stationary cam for engaging said linkage and exerting pressure to squeeze said jaws together during movement from said assembly station.

35. In a machine for uniting flanges and a core to form a spool at an assembly station, the combination with a carrier rotatably mounted, a core holder including a jaw fixed to said carrier, and a second jaw movable with respect to said carrier, and the other jaw and biased to closed position, and a power drive for rotating said carrier and for moving the core holder through said assembly station, of a linkage between said carrier and the movable jaw and including a compressible link connected to said movable jaw, and a stationary cam for engaging said linkage during rotation of said carrier and having a portion for moving said linkage to compress said link and to press said movable jaw tightly against the other jaw.

36. In a machine for uniting flanges and a core which is provided with two slots of unequal length, the combination with a core holder including a fixed jaw and a movable jaw, both jaws being provided with grooves for receiving a core and being biased to closed position, a pair of projections within the groove of one of said jaws and spaced at a distance greater than the length of one slot and less than the length of the other slot in said core, and a carrier for supporting a core holder, of a mechanism for turning the core between the said jaws until the longest slot engages said projections definitely to position said core in the core holder on said carrier.

37. In a machine for uniting flanges and a core which is provided with two slots of unequal length, the combination with a core holder including a fixed jaw and a movable jaw, both jaws being provided with grooves forming a cylindrical bore for receiving a core in closed position on said jaws, a pair of projections within the groove on one of said jaws and spaced to engage the longer but not the shorter slot in said core, and a resilient means acting on said movable jaw to bias said jaws to closed position, of a mechanism for turning the core between said jaws until said projections move into said longer slot in the core under the action of said resilient means.

38. In a machine for uniting flanges to a core to form a spool, the combination with a carrier rotatably mounted, a core holder on said carrier and including a fixed jaw and a movable jaw which is biased to closed position for holding a core, and an intermittent power drive for rotating said carrier and providing a stationary interval, of an actuator controlling said movable jaw and permitting movement thereof to closed position during the latter portion of said stationary interval, and a spinner axially movable in timed relation to said actuator and for turning said core during the latter portion of said stationary interval.

39. In a machine for uniting flanges to a core to form a spool, the combination with a carrier rotatably mounted, a core holder on said carrier and including a fixed jaw and a movable jaw which is biased to a closed position for holding a core, and an intermittent power drive for rotating said carrier and providing a stationary interval, of an actuator controlling said movable jaw and permitting movement thereof to closed position during the latter portion of said stationary interval, a spinner axially movable to a forward position for engagement with the core which is between said jaws, and a control means for governing the axial movement of said spinner and including a cam for moving said spinner to and from said forward position during the latter portion of said stationary interval.

40. In a machine for uniting flanges to a core to form a spool, the combination with a carrier rotatably mounted, a core holder on said carrier and including a fixed jaw and a movable jaw which is biased to a closed position for holding a core, and an intermittent power drive for rotating said carrier and providing a stationary interval, of an actuator controlling said movable jaw and permitting movement thereof to closed position during the latter portion of said stationary interval, a spinner axially movable to a forward position and having a portion adapted frictionally to engage the core which is between said jaws, a stripper on the end of said spinner and biased normally to cover the portion for engaging the core, and a control means for axially moving said spinner to forward position and said stripper into abutment with the end of said core, and for moving the engaging portion of said spinner beyond said stripper and into engagement with said core.

41. In a machine for uniting flanges to a core to form a spool, the combination with a carrier rotatably mounted, a core holder on said carrier and including a fixed jaw and a movable jaw which is biased to a closed position for holding a core, and an intermittent power drive for rotating said carrier and providing a stationary interval, of an actuator controlling said movable jaw and permitting movement thereof to closed position during the latter portion of said stationary interval, a spinner axially movable to a forward position and having a portion adapted frictionally to engage the core which is between said jaws, a stripper on the end of said spinner and biased normally to cover the portion for engaging the core, and a control means for axially moving said spinner to forward position and said stripper into abutment with the end of said core, and for moving the engaging portion of said spinner beyond said stripper and into engagement with said core, and including a cam for moving said spinner and said stripper to and from said forward position during the latter portion of said stationary interval.

42. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores, a transfer means for moving a core from said hopper to said jaws during the first part of said stationary interval and while said jaws are in open position.

43. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores and including a core guideway and a rocking bottom for promoting the feed of cores to said guideway, and a transfer means for moving a core from the core guideway of said hopper to said jaws during the first part of said stationary interval and while said jaws are in open position.

44. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores and including a core guideway and a movable closure with a cam surface for said guideway, and a transfer means for gripping a core in said guideway, moving the core against said cam surface to open said closure, and moving the core from said guideway to said jaws during the first part of said stationary interval and while said jaws are in open position.

45. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores, and a transfer means including a shaft, a pair of sectors fixed to said shaft in spaced relation and adapted to grip a core, and means for rotating said shaft in timed relation to said intermittent power drive and to move said core from said hopper to said jaws during the first part of said stationary interval and while said jaws are in open position.

46. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores, and a transfer means including a shaft, a pair of sectors fixed to said shaft in spaced relation and adapted to grip a core, and means for rotating said shaft in timed relation to said intermittent power drive, to move a core from said hopper to said jaws during open position thereof and to return said sector for engagement with another core in said hopper after said jaws have been moved by said actuator to closed position.

47. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores, and a transfer means including a shaft, a pair of sectors spaced on said shaft a distance equal to the length of a core, grippers on opposed spaces of said sectors and adapted to engage a core, and means for rotating said shaft in timed relation to said intermittent power drive and to move the core between said gripper from said hopper to said jaws during open position thereof.

48. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a core feed hopper for containing a supply of cores, and a transfer means including a shaft, a pair of sectors spaced on said shaft a distance equal to the length of a core, grippers on opposed spaces of said sectors and adapted to engage a core, a pinion on said shaft, a rack engaging said pinion and a cam for reciprocating said rack to rotate said shaft in timed relation to said actuator, to move said core between said jaws in open position and to return said sectors for engagement with another core after said jaws have moved to closed position.

49. In a machine for uniting flanges to a core to form a spool, the combination with a carrier rotatably mounted, a core holder on said carrier and including a pair of jaws movable to an open position and to a closed position for holding a core, and an intermittent power drive for rotating said carrier and providing a stationary interval, of an actuator controlling the position of said jaws and timed to maintain said jaws in open position during the first part of said stationary interval, a transfer means including a pair of sectors for moving a core to a position between said jaws during open position thereof, and a spinner axially movable in timed relation to said actuator for turning said core during the latter portion of said stationary interval, one of said sectors abutting the end of said core at this time to prevent axial movement of said core by said spinner.

50. In a machine for uniting flanges to a core to form a spool, the combination with a carrier rotatably mounted, a core holder on said carrier and including a pair of jaws movable to an open position and biased to a closed position for holding a core, and an intermittent power drive for rotating said carrier and providing a stationary interval, of an actuator controlling the position of said jaws and timed to maintain said jaws in open position during the first part of said stationary interval and then permitting said jaws to close during the remainder of said interval, a transfer means for moving a core to a position between said jaws during open position thereof and for returning to engage another core after said jaws have been moved to closed position by said actuator, and a spinner axially movable in timed relation to said actuator for turning the core during the latter portion of said stationary interval when said jaws are in closed position.

51. In a spool making machine, the combination with a carrier rotatably mounted, a spool holder on said carrier and including a pair of jaws movable to an open position and to a closed position for holding a spool, and an intermittent power drive for rotating said carrier and providing a stationary interval with said core holder at a delivery station, of an actuator for controlling the position of said jaws at said delivery station and timed to open said jaws during the latter part of said stationary interval, and a delivery mechanism including a pair of members for engaging said spool while in said spool holder and including a shaft for rotating said member to move said spool out of said core holder after said jaws are opened by said actuator.

52. In a spool making machine, the combination with a carrier rotatably mounted, a spool holder on said carrier and including a pair of jaws movable to an open position and to a closed position for holding a spool, and an intermittent power drive for rotating said carrier and providing a stationary interval with said core holder at a delivery station, of an actuator for controlling the position of said jaws at said delivery station and timed to open said jaws during the latter part of said stationary interval, a delivery mechanism including a shaft, a pair of members on said shaft and movable to engage and disengage said spool, and a linkage on said shaft and for moving said members in opposite direction, a rocker member in timed relation to said power drive and operative through said linkage to move said pair of members to engage the spool in the core holder, and a means for rotating said members to move said spool out of said core holder and timed to operate after said actuator has opened said jaws of the spool holder.

53. In a spool making machine, the combination with a carrier rotatably mounted, a spool holder on said carrier and including a pair of jaws movable to an open position and to a closed position for holding a spool, and an intermittent power drive for rotating said carrier and providing a stationary interval with said core holder at a delivery station, of an actuator for controlling the position of said jaws at said delivery station and timed to open said jaws during the latter part of said stationary interval, a delivery mechanism including a shaft, a pair of members on said shaft and movable to engage and disengage said spool, and a linkage on said shaft and for moving said members in opposite directions, a means for rotating said shaft to move said spool out of said core holder and timed to operate after said actuator has opened said jaws of the spool holder, and a rocker means including a cam in timed relation to said power drive and operative through said linkage to move said pair of members to engage the spool in the core holder and to move said pair of members to release the spool after removal from the core holder by the rotating means.

54. In a machine for uniting flanges and a core at an assembly station, the combination with a carrier for supporting a core and rotatably mounted, a second carrier for supporting a flange and rotatably mounted, and an intermittent power drive for rotating said carrier and timed to provide a stationary interval with said core and said flange in alignment at said assembly station, of a plunger slidably mounted in alignment with the core and flange at said assembly station, and an actuating means for reciprocating said plunger in timed relation to said power drive and for carrying a flange from said second carrier into abutment with the end of said core.

55. In a machine for uniting flanges and a core at an assembly station, the combination with a carrier for supporting a core and rotatably mounted, a pair of carriers rotatably mounted and each having a plurality of clutch elements each for supporting a flange, and an intermittent power drive for rotating said carriers and timed to provide a stationary interval with said core and a pair of flanges in alignment at said assembly station, of a pair of electrodes movably in opposite direction and in alignment with the core and the flanges at said assembly station, and an actuating means for reciprocating said electrodes in timed relation to said power drive, for moving said electrodes through opposite clutch elements and for carrying a pair of flanges into abutment with the end of said core.

56. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a plunger which reciprocates in an axial direction to pass into said opening and for moving a flange into engagement with said engaging means.

57. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a plunger which reciprocates in an axial direction to pass through said opening and for moving a flange out of engagement with said engaging means.

58. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a plurality of teeth axially spaced on each engaging means and having inclined surfaces which slope in the same direction.

59. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a pair of teeth axially spaced on each engaging means, each tooth having a perpendicular surface and an inclined surface.

60. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a plurality of teeth axially spaced on each engaging means and having inclined surfaces which slope in the same direction, and a plunger which reciprocates in an axial direction to move within said opening and for moving a flange against said inclined surfaces to retract the engaging means against the action of said resilient means.

61. In a machine for assembling a spool with flanges, the combination with a ring provided with a central opening and with a peripheral groove, a plurality of engaging means on said ring and adapted to engage a flange within said opening, and a resilient means for biasing said engaging means into engagement with said flange, of a plurality of teeth axially spaced on each engaging means and having perpendicular surfaces, and a plunger which reciprocates in an axial direction to move within said opening and from which flanges are stripped by the perpendicular surfaces of the engaging means.

JOHN G. JONES.
HAYWOOD G. DEWEY.